June 21, 1938.  W. WILLIAMS  2,121,752
CUTTING TOOL
Filed Nov. 23, 1937
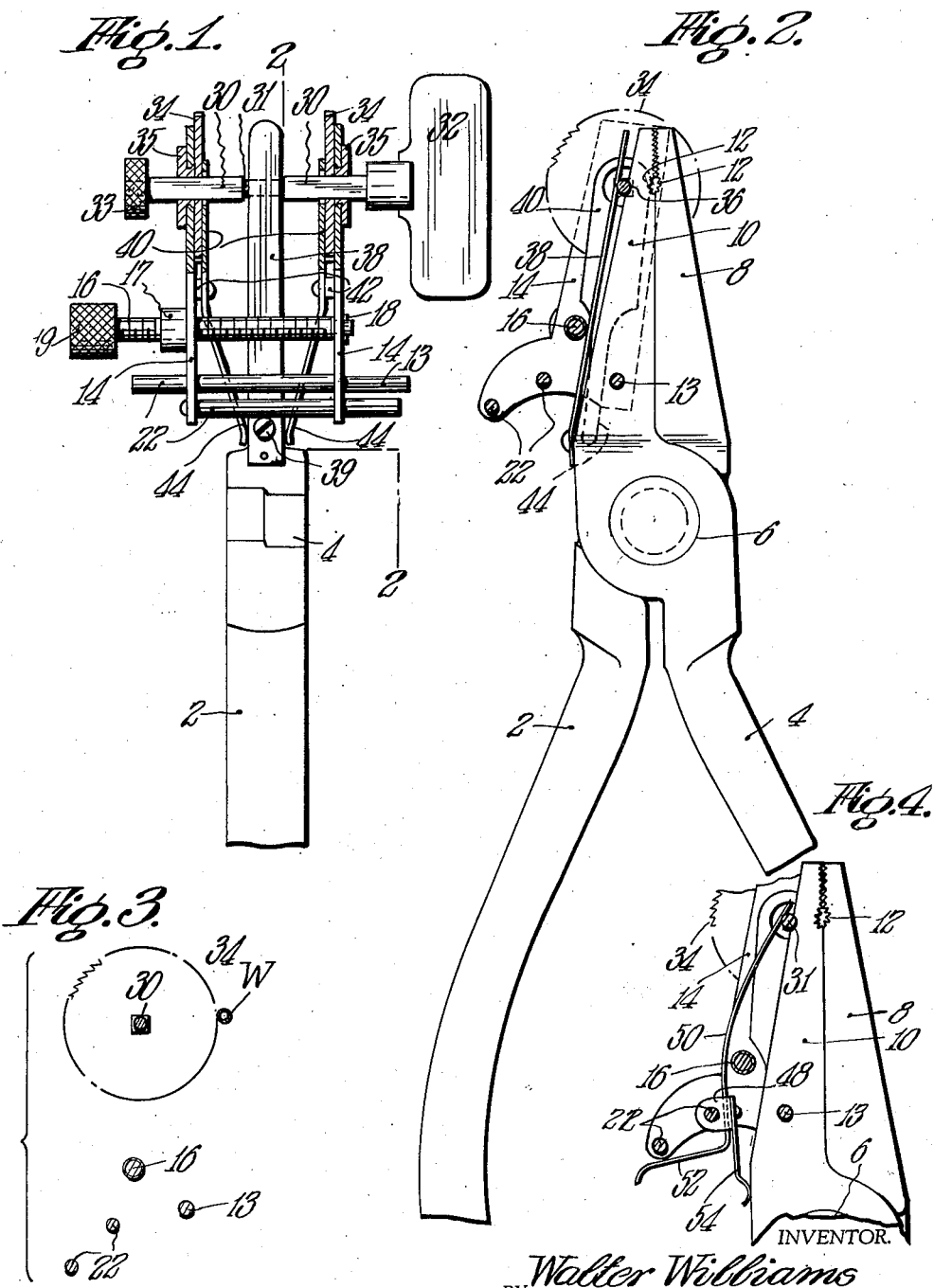
INVENTOR.
Walter Williams
BY Walter C. Russ
ATTORNEY.

Patented June 21, 1938

2,121,752

UNITED STATES PATENT OFFICE 2,121,752

CUTTING TOOL

Walter Williams, Springfield, Mass., assignor to Williams Jewelry Distributors Corp., Springfield, Mass., a corporation of Massachusetts Application November 23, 1937, Serial No. 176,081

6 Claims. (Cl. 29—69)

This invention relates to improvements in cutting tools and is directed more particularly to an improved tool for cutting rods or tubes of predeterminated lengths.

This application is a continuation in part of an application, Ser. No. 130,246, filed by me on March 11, 1937.

It is one of the principal objects of the invention to provide a cutting tool which is adapted to cut from lengths of rod or tubing pieces of a certain predetermined length and the tool is so arranged that its cutting parts may be variably spaced so as to produce cut pieces of varied widths.

It is a further object of the invention to provide a cutting tool having movable work-clamping parts and cutting parts associated therewith in such a way as to be movable towards and away from the work to be cut. With the arrangement of this invention, the work can be firmly held in position and the cutting parts moved up against it with safety.

Still another object of the invention is to provide a tool for use by watch-makers who frequently are required to cut a number of pieces of tubing, all of a certain predetermined width for use in bracelets or the like. Such pieces are of course small and difficult to handle and it is essential that they be cut with precision. The tool of this invention is adapted to both safely and conveniently hold the work and cut it accurately as desired.

Fig. 1 is a sectional elevational view of the tool of the invention;

Fig. 2 is a side elevational view on the line 2—2 of Fig. 1;

Fig. 3 is a diagrammatic sectional elevational view to explain certain features of the invention; and Fig. 4 is a view similar to Fig. 2 to explain certain modifications of the invention.

Referring now to the drawing more in detail, the invention will be fully described.

The tool of the invention broadly includes a pair of manually-engageable handles 2 and 4 pivoted at 6 and having work-clamping jaw parts 8 and 10 respectively. Adjacent faces of the jaws 8 and 10 may be serrated and there may be cooperating seats 12 for receiving and clamping a piece of work.

A supporting member 13 is rigidly secured to the jaw 10 and plate members 14 are pivoted thereon and slidable thereon back and forth towards and away from one another. A threaded rod 16 is provided and this has its right hand end fixed against axial movements in the right-hand plate 14, as by means of a pin 18, and it threadedly engages a part 17 associated with the left-hand plate 14.

A knurled knob such as 19 on the end of threaded rod 16 facilitates rotating the same so that the plates 14 can move towards and away from one another. Guide rods 22 are preferably provided and each of these has one end fixed in one plate 14 and the other end freely slidable in the other plate 14. Thus as the plates 14 move towards and away from one another the guides 22 serve to maintain the same in alignment.

Shaft having squared portions 30 and a central cylindrical portion 31 carries key 32 adapted for manual engagement whereby the said shaft may be rotated. Cutter wheels 34 are provided with squared openings which slidably receive the squared portions 30 of the shaft and bushings, such as 35, which are rotatable in the plates or brackets 14, are likewise provided with squared openings to slidably receive the said shaft portions 30.

A nut member 33 may be in threaded engagement with that end of the cutter shaft which is opposite key 32 to prevent the shaft's being pulled through the brackets 14.

Retainer members 40 are preferably provided to have portions bearing on the inner sides of the cutter wheels 34. The members 42 may be secured to the plates 14 by rivets 42 and their lower end portions 44 extend inwardly towards one another into abutment with the opposite side faces of the jaw 10.

The lower portions 44, at least, of the retainers are made so as to be spring-like. With the arrangement described they yieldingly urge the plates 14 outwardly away from one another and when the shaft 16 is rotated to move the plates, the spring action causes the plates 14 to move uniformly so that the cutter wheels 34 are retained in equal distance from the opposite sides of jaw 10.

A spring member 38 may be secured to the jaw 10, by such means as a screw 39, and this has a free end part bearing on the rounded part 31 of the cutter shaft. This tends to urge the shaft and its associated parts against the jaws so that the rounded part 31 is yieldingly retained in a seat indicated by 36 in Fig. 2.

The tool is adapted for cutting off small rods, tubes and the like and for squaring up the ends of the same. To that end, a piece of work, such as a tube or rod, is clamped between the seats 12 of the jaws 8 and 10 by squeezing the hand grips 2 and 4 together.

The plates 14 are moved, of course, away from the jaws on pivot 13 to permit the insertion of the work between the jaws until the work is clamped. This may be done by pressing the thumb downwardly on either of rods 22 and then by releasing the pressure, the spring 38 may urge the plates forwardly towards the jaws so that the cutters 34 may engage the work as indicated diagrammatically in Fig. 3.

The plates 14 are moved back and forth on shaft 16 and rods 22 relative to one another so that the cutting wheels 34 are positioned to cut the work in the right length. When so positioned, the cutting wheel shaft is rotated by means of the key 32 and the whole assembly is so held that the desired pressure may be applied thereto to bring about the cutting of the work by the cutting wheels.

In the modification of the invention shown in Fig. 4, a bracket such as 48 is carried by one of the guides 22 and from this bracket there extends a relatively stiff spring-like member which may be equal in width to member 38 shown in Fig. 1. The forward end portion of the member 50 bears on the rounded part 31 of the cutting wheel shaft while its lower end portion 52 extends outwardly, as shown, so as to be manually engageable.

A spring member 54 is fixed to the bracket 48 and it has a free end portion which engages the jaw 10. The latter tends to hold bracket 48 in such a way that member 50 yieldingly bears on part 31 of the shaft.

Thus, with the work held in place as indicated in Fig. 3 and with the grips 2 and 4 in the hand, the thumb of the hand may be pressed against part 52 so as to urge the part 50 against the cutting wheel shaft. Thus when the latter is rotated by the key 32 the cutting wheels operate on the work with the desired pressure.

A further feature of either member 38 or part 50 is that since they normally bear on rounded part 31 of the shaft, which is of smaller diameter than the squared portions at either side thereof, the shaft is prevented from moving axially and the whole assembly tends to remain in line.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. A cutting tool of the class described comprising in combination, a pair of work-clamping members pivoted together so as to have parts movable towards and away from one another, a support associated with one of said members including a pair of brackets pivoted so as to be movable towards and away from said members in the direction of movement of the latter, a threaded rod rotatably associated with said brackets whereby the brackets may be moved axially thereof towards and away from one another and a rotatable cutter wheel associated with each of said brackets.

2. A cutting tool of the class described comprising in combination, a pair of work-clamping members pivoted together so as to have parts movable towards and away from one another, a support associated with one of said members including a pair of brackets pivoted so as to be movable towards and away from said members in the direction of movement of the latter, a threaded rod rotatably associated with said brackets whereby the brackets may be moved axially thereof towards and away from one another and a rotatable cutter wheel associated with each of said brackets, and spring means urging the said support towards said one work-clamping member.

3. A cutting tool of the class described comprising in combination, a pair of work-clamping members pivoted together so as to have parts movable towards and away from one another, a support associated with one of said members including a pair of brackets pivoted so as to be movable towards and away from said members in the direction of movement of the latter, means whereby the brackets may be moved towards and away from one another, a rotatable cutter wheel associated with each of said brackets, and means for equalizing the movement of said brackets relative to said work-clamping members.

4. A cutting tool of the class described comprising in combination, a pair of work-clamping members pivoted together so as to have parts movable towards and away from one another, a support associated with one of said members including a pair of brackets pivoted so as to be movable towards and away from said members in the direction of movement of the latter, means whereby the brackets may be moved towards and away from one another, a rotatable cutter wheel associated with each of said brackets, and means for equalizing the movement of said brackets relative to said work-clamping members, said means including spring-like members having portions fixed to said brackets and portions bearing on said wheels.

5. A cutting tool of the class described comprising in combination, a pair of work clamping jaw members pivoted together so as to have jaws movable towards and away from one another, a support pivotally associated with one of said jaws including a pair of brackets arranged to be movable towards and away from said jaw in the direction of movement of the latter, means associated with the brackets to move them towards and away from one another, a rotatable cutter wheel associated with each of said brackets, and means for equalizing the movement of said brackets relative to said work clamping jaws including spring-like members having portions fixed to said brackets and portions bearing on one of said jaws.

6. A cutting tool of the class described comprising in combination, a pair of work clamping jaw members pivoted together so as to have jaws movable towards and away from one another, a support pivotally associated with one of said jaws including a pair of brackets arranged to be movable towards and away from said jaw in the direction of movement of the latter, means associated with the brackets to move them towards and away from one another, a rotatable cutter wheel associated with each of said brackets, and means for equalizing the movement of said brackets relative to said work clamping jaws including spring-like members having intermediate portions fixed to said brackets with end portions bearing on one of said jaws and end portions bearing on said cutter wheels.

WALTER WILLIAMS.